(12) United States Patent
Zhao et al.

(10) Patent No.: US 10,145,716 B2
(45) Date of Patent: Dec. 4, 2018

(54) MASS AIRFLOW SENSOR INCLUDING ONE OR MORE FLOW DEFLECTORS FOR INHIBITING REVERSE AIRFLOW THROUGH THE MASS AIRFLOW SENSOR

(71) Applicant: GM Global Technology Operations LLC, Detroit, MI (US)

(72) Inventors: Guangzhi A. Zhao, Troy, MI (US); Bryant G. Hammond, West Bloomfield, MI (US); Christopher K. Clarke, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 15/071,568

(22) Filed: Mar. 16, 2016

(65) Prior Publication Data

US 2017/0268918 A1  Sep. 21, 2017

(51) Int. Cl.
| | |
|---|---|
| *G01F 1/76* | (2006.01) |
| *G01F 1/32* | (2006.01) |
| *G01F 15/14* | (2006.01) |
| *F02D 41/18* | (2006.01) |
| *G01F 1/684* | (2006.01) |
| *G01F 15/00* | (2006.01) |
| *F15D 1/02* | (2006.01) |
| *G01F 1/69* | (2006.01) |

(52) U.S. Cl.
CPC .............. *G01F 1/76* (2013.01); *F02D 41/18* (2013.01); *G01F 1/3236* (2013.01); *G01F 1/6842* (2013.01); *G01F 15/00* (2013.01); *G01F 15/14* (2013.01); *F15D 1/02* (2013.01); *G01F 1/69* (2013.01)

(58) Field of Classification Search
CPC .......... G01F 1/76; G01F 1/6842; G01F 15/00; G01F 15/14; G01F 1/69; G01F 1/8413; F15D 1/02; F15D 1/00; F15D 1/0005; F15D 1/003
USPC ...................................................... 73/114.32
See application file for complete search history.

(56) References Cited

U.S. PATENT DOCUMENTS

| | | | | |
|---|---|---|---|---|
| 2,541,373 A | * | 2/1951 | McLeod | F01N 1/003 181/247 |
| 2004/0182171 A1 | * | 9/2004 | Igarashi | G01F 1/6842 73/861 |
| 2013/0008243 A1 | * | 1/2013 | Tagawa | G01F 1/6842 73/114.32 |

* cited by examiner

*Primary Examiner* — Manish S Shah
*Assistant Examiner* — Timothy Graves

(57) ABSTRACT

A mass airflow sensor according to the present disclosure includes a housing, a sensor element, and a flow deflector. The housing defines an airflow passage configured to receive air flowing in a first direction. The sensor element is disposed in the airflow passage and generates a signal indicating a mass flow rate of air flowing through the airflow passage. The flow deflector is disposed in the airflow passage downstream of the sensor element, extends from an inner wall surface of the airflow passage, and is configured to inhibit air flow through the airflow passage in a second direction that is opposite of the first direction.

20 Claims, 3 Drawing Sheets

MASS AIRFLOW SENSOR INCLUDING ONE OR MORE FLOW DEFLECTORS FOR INHIBITING REVERSE AIRFLOW THROUGH THE MASS AIRFLOW SENSOR

FIELD

The present disclosure relates to mass airflow sensors, and more particularly, to mass airflow sensors including one or more flow deflectors for inhibiting reverse airflow through the mass airflow sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Mass airflow sensors are used to measure the mass flow rate of air entering an engine. Engine control systems use the measured mass flow rate of intake air when determining how much fuel to deliver to cylinders of an engine in order to achieve a desired air/fuel ratio. Inaccuracies in the measured mass flow rate of intake air may lead to engine performance issues, such as misfire, and may cause damage to the engine.

SUMMARY

A mass airflow sensor according to the present disclosure includes a housing and a sensor element. The housing defines an airflow passage configured to receive air flowing in a first direction. The sensor element is disposed in the airflow passage and generates a signal indicating a mass flow rate of air flowing through the airflow passage. In one example, the mass airflow sensor further includes a flow deflector that is disposed in the airflow passage downstream of the sensor element, that extends from an inner wall surface of the airflow passage, and that is configured to inhibit air flow through the airflow passage in a second direction that is opposite of the first direction. In one example, the mass airflow sensor further includes a plurality of flow deflectors that are disposed in the airflow passage downstream of the sensor element and that extend from an inner wall surface of the airflow passage toward an outlet of the airflow passage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Mass airflow sensors typically include an airflow passage and a sensor element disposed in the airflow passage that generates a signal indicating the mass flow rate of air flowing past the sensor element. In one example, the sensor element includes a wire having an electrical resistance that increases as the temperature of the wire increases and vice versa. When air flows past the wire, the wire cools, which decreases the resistance of the wire and, in turn, allows more current to flow through the wire. Thus, the amount by which current flowing through the wire increases or decreases is proportional to the mass flow rate of air flowing past the wire.

In boosted engines, a mass airflow sensor is typically located in an intake system of the engine upstream of a compressor. The compressor increases the pressure in the intake system, which may cause reverse airflow through the mass airflow sensor. In turn, the mass flow rate of intake air measured by the mass airflow sensor may be greater than the actual mass flow rate of intake air. These inaccuracies in the mass flow rate of intake air may cause the engine to experience performance issues, such as misfire, and may cause damage to the engine.

A mass airflow sensor according to the present disclosure includes one or more flow deflectors that are configured to inhibit reverse airflow through the mass airflow sensor. The flow deflectors extend from an inner surface of the airflow passage and are angled toward an outlet of the mass airflow sensor. The angle at which the flow deflectors extend, as well as the shape, size, and positioning of the flow deflectors, allows air to flow in a forward (e.g., normal) direction through the mass airflow sensor while inhibiting reverse airflow through the mass airflow sensor.

Figure 1:
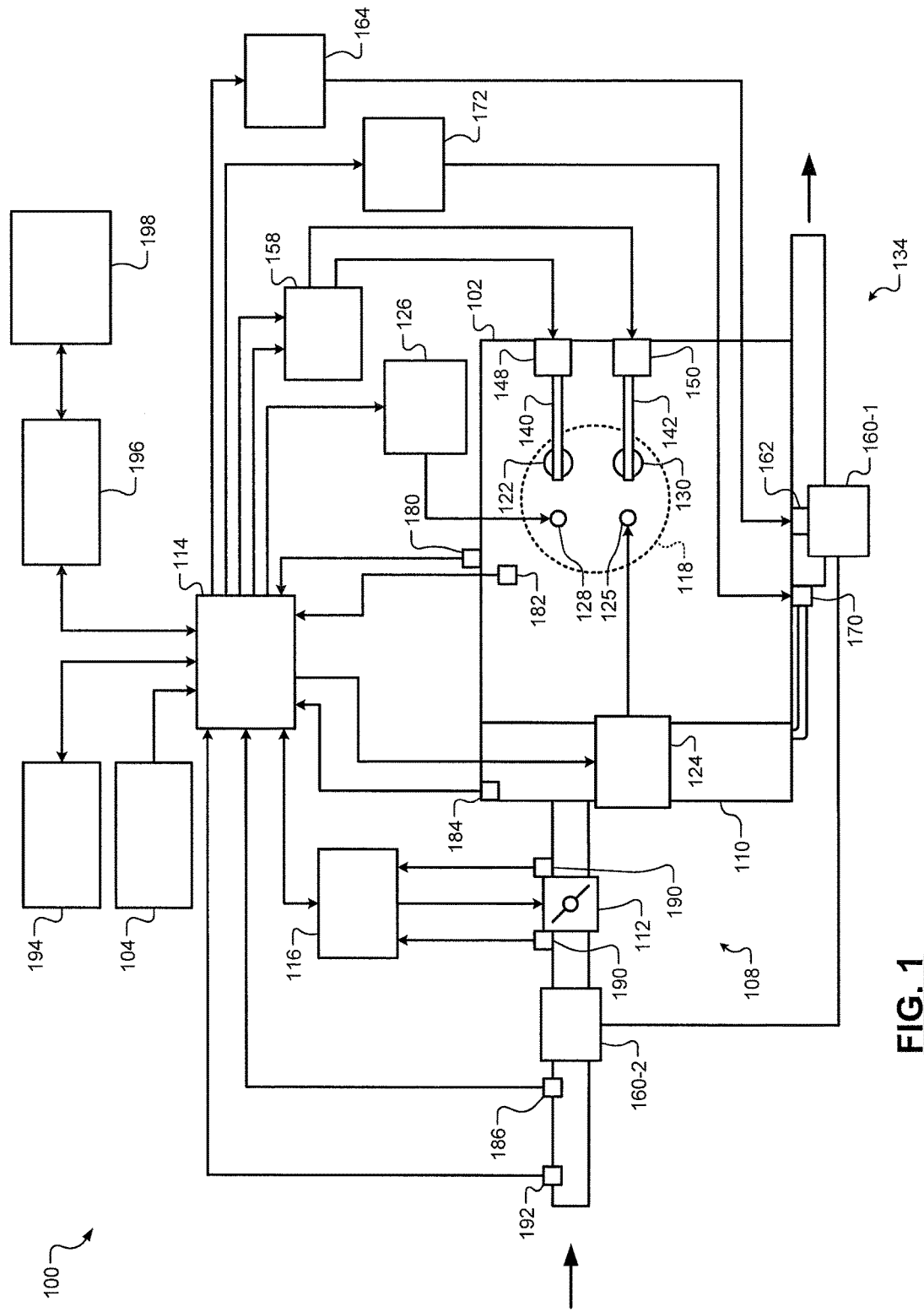
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may actuate the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 uses signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

Figure 2:
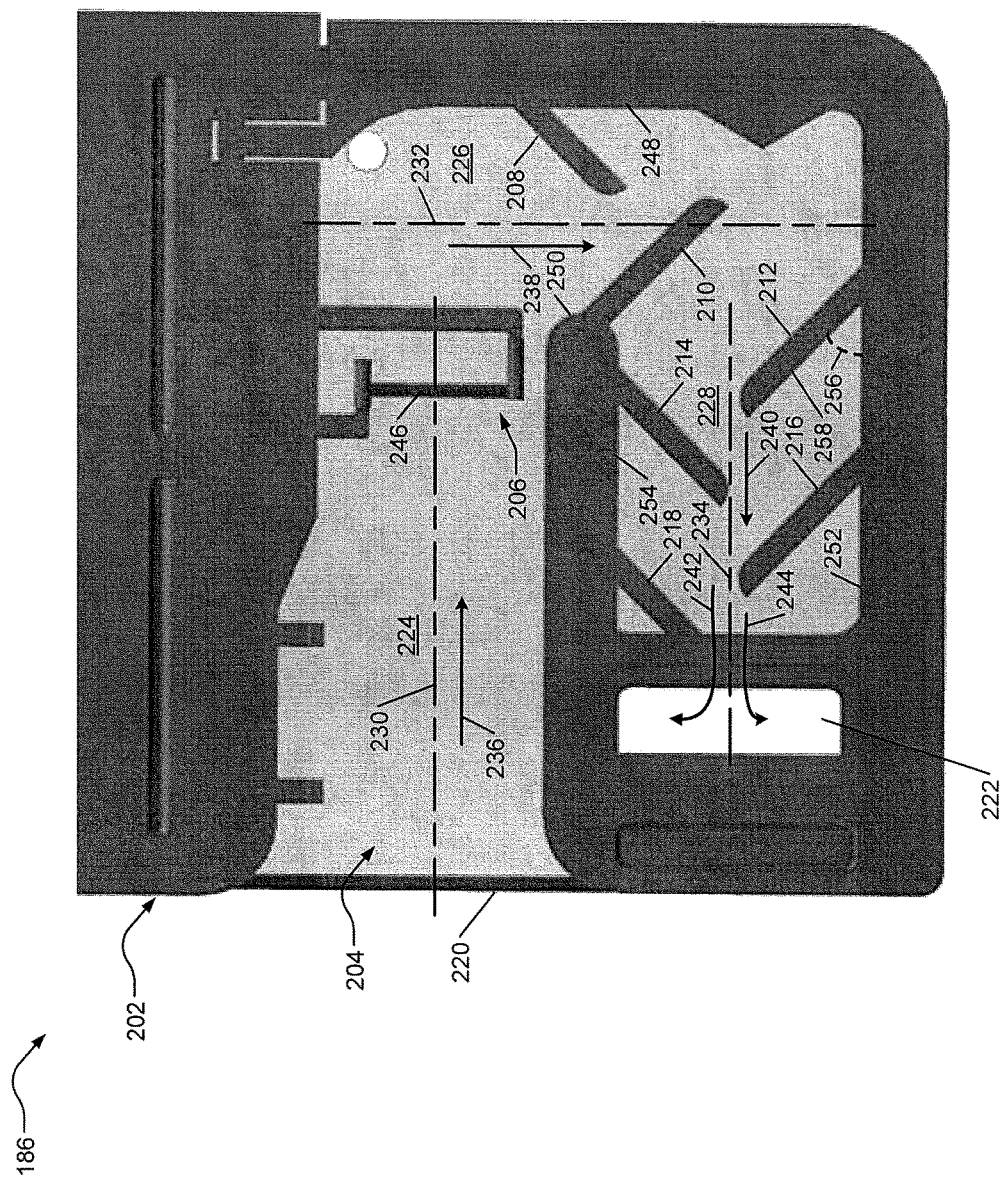
FIG. 2 is a sectioned side view of a mass airflow sensor according to the principles of the present disclosure.

Referring now to FIG. 2, an example implementation of the MAF sensor 186 includes a sensor housing 202 defining an airflow passage 204, a sensor element 206, and flow deflectors 208-218. The airflow passage 204 has an inlet 220 and an outlet 222 and includes a first portion 224, a second portion 226, and a third portion 228. The first portion 224 has a first longitudinal axis 230 and extends from the inlet 220 of the airflow passage 204 to the second portion 226. The second portion 226 has a second longitudinal axis 232 and extends from the first portion 224 to the third portion 228. The third portion 228 has a third longitudinal axis 234 and extends from the second portion 226 to the outlet 222 of the airflow passage 204. The second longitudinal axis 232 is perpendicular to the first longitudinal axis 230 and the third longitudinal axis 234 is perpendicular to the second longitudinal axis 232. The first, second, and third longitudinal axis 230, 232, and 234 may be collectively referred to as a longitudinal center of the airflow passage 204.

Air enters the airflow passage 204 through the inlet 220 of the airflow passage 204 and flows through the first portion 224 of the airflow passage 204 in a first direction 236 that is parallel to the first longitudinal axis 230. As the air flows from the first portion 224 of the airflow passage 204 to the second portion 226 of the airflow passage 204, the airflow changes direction. Air flows through the second portion 226 of the airflow passage 204 in a second direction 238 that is parallel to the second longitudinal axis 232. As the air flows from the second portion 226 of the airflow passage 204 to the third portion 228 of the airflow passage 204, the airflow once again changes direction. Air flows through the third portion 228 of the airflow passage 204 in a third direction 240 that is parallel to the third longitudinal axis 234.

Air exits the airflow passage 204 through the outlet 222 of the airflow passage 204. A portion of the air exiting the airflow passage 204 flows in a fourth direction 242 that extends into the page as shown in FIG. 2. The remainder of the air exiting the airflow passage 204 flows in a fifth direction 244 that extends out of the page as shown in FIG. 2. The first, second, third, fourth, and fifth directions 236-244 in which air flows through the airflow passage 204 may be collectively referred to as a forward direction of airflow through the airflow passage 204.

The sensor element 206 is disposed in the first portion 224 of the airflow passage 204 and generates a signal indicating the mass flow rate of air flowing past the sensor element 206. In the example shown in FIG. 2, the sensor element 206 includes a wire 246 having an electrical resistance that increases as the temperature of the wire 246 increases and vice versa. When air flows past the wire 246, the wire 246 cools, which decreases the resistance of the wire 246 and, in turn, allows more current to flow through the wire 246. Thus, the amount by which current flowing through the wire 246 changes is proportional to the mass flow rate of air flowing past the wire 246.

In various implementations (not shown), the sensor element 206 may include a spring-loaded air vane (e.g., a flap or door) attached to a variable resistor (e.g., a potentiometer). The vane moves in proportion to the airflow. A voltage is applied to the potentiometer and a proportional voltage appears on the output terminal of the potentiometer in proportion to the angle the vane rotates. The voltage appearing on the output terminal is a signal indicating the mass flow rate of air flowing past the vane.

The flow deflectors 208-218 are disposed in the airflow passage 204 downstream of the sensor element 206 and are configured to inhibit airflow through the airflow passage 204 in a reverse direction that is opposite of the forward direction. The flow deflectors 208-218 include a first flow deflector 208, a second flow deflector 210, a third flow deflector 212, a fourth flow deflector 214, a fifth flow deflector 216, and a sixth flow deflector 218. Although the mass flow sensor 186 is depicted as including six flow deflectors, the mass flow sensor 186 may include additional or fewer flow deflectors. For example, the mass flow sensor 186 may include four or five flow deflectors.

The first and second flow deflectors 208 and 210 are disposed in the second portion 226 of the airflow passage 204. The first flow deflector 208 extends from a first inner surface 248 of the airflow passage 204. The second flow deflector 210 extends from a second inner surface 250 of the airflow passage 204 that is opposite of the first inner surface 248. The first and second flow deflectors 208 and 210 are offset relative to one another along the second longitudinal axis 232 of the airflow passage 204.

The third, fourth, fifth, and sixth flow deflectors 212-218 are disposed in the third portion of the airflow passage 204. The third and fifth flow deflects 212 and 216 extends from a third inner surface 252 of the airflow passage 204. The fourth and sixth flow deflectors 214 and 218 extend from a fourth inner surface 254 of the airflow passage 204 that is opposite of the third inner surface 252. The third and fifth flow deflects 212 and 216 may be referred to as a first set of flow deflectors, and the fourth and sixth flow deflectors 214 and 218 may be referred to as a second set of flow deflectors. The first and second set of flow deflectors are offset relative to one another along the third longitudinal axis 234 of the airflow passage 204.

The flow deflectors 208-218 extend from the inner surfaces 248-254 of the airflow passage 204 toward the longitudinal center of the airflow passage 204 and toward the outlet 222 of the airflow passage 204. Thus, the flow deflectors 208 are angled in the forward direction. An angle 256 between a downstream side 258 of each of the flow deflectors 208-218 and the corresponding one of the inner surfaces 248-254 from which the flow deflectors 208-218 extend may be between 30 degrees and 45 degrees. In one example, the angle 256 is equal to 45 degrees.

Figure 3:
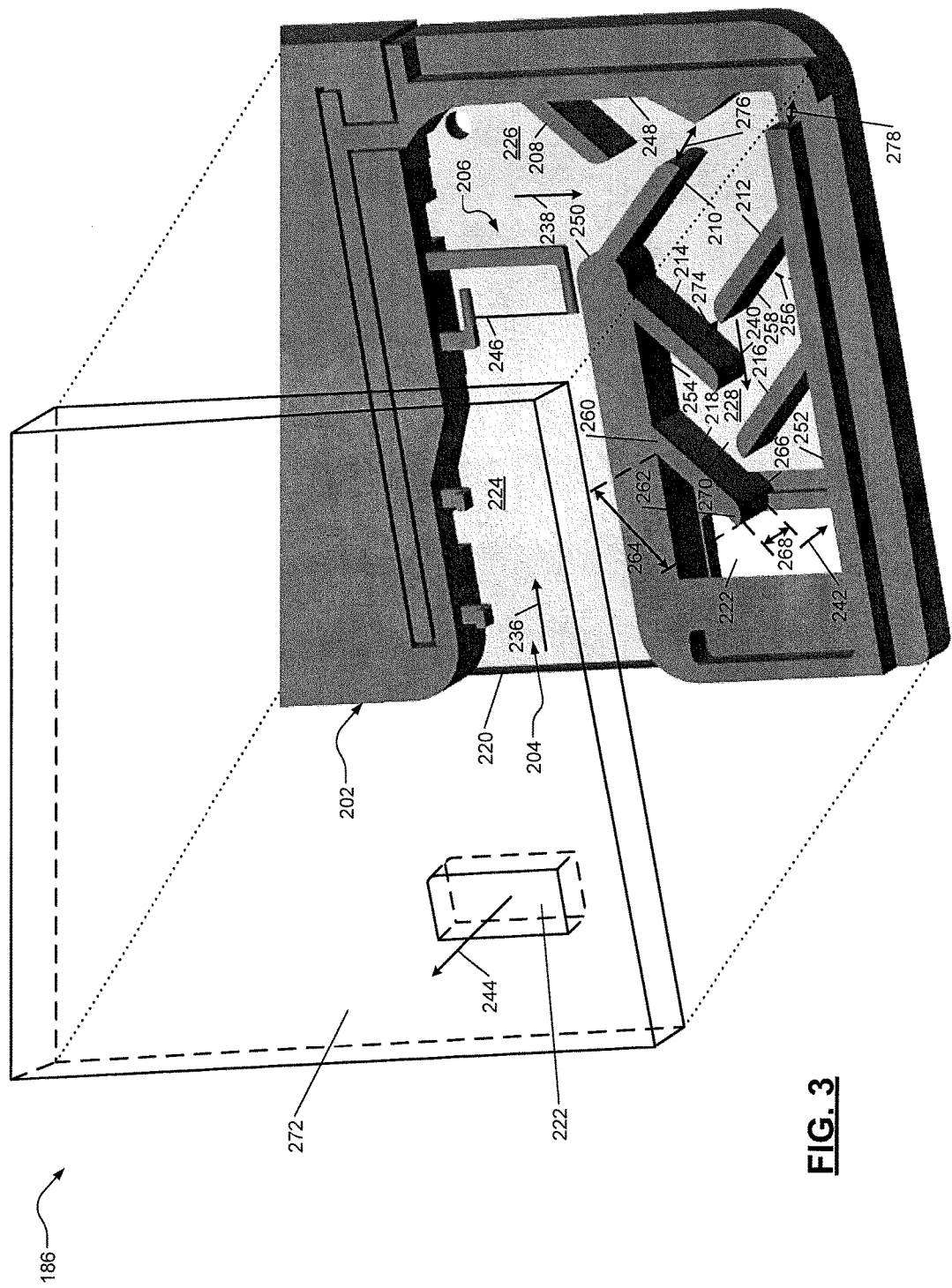
FIG. 3 is an exploded perspective view of a mass airflow sensor according to the principles of the present disclosure.

Referring now to FIG. 3, each of the flow deflectors 208-218 has a first end 260 attached to the corresponding one of the inner surfaces 248-254, a second end 262 opposite of the first end 260, and a length 264 extending from the first end 260 to the second end 262. The length 264 of each of the flow deflectors 208-218 extends toward the outlet 222 of the airflow passage 204 and toward the longitudinal center of the airflow passage 204. The length 264 of each of the flow deflectors 208-218 may be between 3.0 millimeters (mm) and 5.8 mm.

An upstream edge 266 of the second end 262 of each of the flow deflectors 208-218 may be rounded as shown to reduce a flow restriction imparted by the flow deflectors 208-218. Each of the flow deflectors 208-218 has a thickness 268 that extends from a first sidewall 270 of the airflow passage 204 to a second sidewall 272 of the airflow passage 204 that is opposite of the first sidewall 270. The thickness 268 of each of the flow deflectors 208-218 may be approximately 1.0 mm.

The positioning of the flow deflectors 208-218, including the staggering or relative offsets between the flow deflectors 208-218 in the forward direction of airflow, provides gaps between the flow deflectors 208-218 through which air may flow. For example, a first gap 274 between the third and fourth flow deflectors 212 and 214 allows airflow between the third and fourth flow deflectors 212 and 214. The size of the first gap 274 may be between 2.0 mm and 2.2 mm. In addition, a second gap 276 between the second flow deflector 210 and the first inner surface 248 allows airflow between the second flow deflector 210 and the first inner surface 248. The size of the second gap 276 may be between 2.5 mm and 5.0 mm.

In various implementations, a third gap 278 is defined between the walls defining the first inner surface 248 and third inner surface 252. The third gap 278 acts as a bypass passage by allowing a small portion of air flowing in the forward direction through the airflow passage 204 to bypass the third portion 228 thereof.

The angle 256 at which each of the flow deflectors 208-218 extend, as well as the shape, size, and positioning of the flow deflectors 208-218, allows air to flow in the forward direction through the airflow passage 204 while inhibiting airflow in the reverse direction through the airflow passage 204. In turn, the mass flow rate of intake air measured by the MAF sensor 186 may be more accurate and more reliable than intake air mass flow rates measured by other MAF sensors. Thus, using the MAF sensor 186 to measure the mass flow rate of intake air may prevent engine performance issues, such as misfire, and may prevent engine damage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include, software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A mass airflow sensor comprising:
a housing defining an airflow passage configured to receive air flowing in a first direction toward a combustion chamber of an engine;
a sensor element that is disposed in the airflow passage and that generates a signal indicating a mass flow rate of air flowing through the airflow passage; and
a flow deflector that has an elongated shape, that is disposed in the airflow passage downstream of the sensor element, that extends from an inner wall surface of the airflow passage, and that is configured to inhibit air flow through the airflow passage in a second direction that is opposite of the first direction.

2. The mass airflow sensor of claim 1 wherein the flow deflector extends from the inner wall surface of the airflow passage toward a longitudinal center of the airflow passage and are angled in the first direction.

3. The mass airflow sensor of claim 1 wherein the flow deflector extends from a first sidewall of the airflow passage to a second sidewall of the airflow passage that is opposite of the first sidewall.

4. The mass airflow sensor of claim 1 wherein an angle between a downstream side of the flow deflector and the inner wall surface of the airflow passage is between 30 degrees and 45 degrees.

5. The mass airflow sensor of claim 1 wherein the flow deflector includes a plurality of flow deflectors.

6. The mass airflow sensor of claim 5 wherein the plurality of flow deflectors include a first set of flow deflectors that extend from a first inner surface of the airflow passage and a second set of flow deflectors that extend from a second inner surface of the airflow passage that is opposite of the first inner surface.

7. The mass airflow sensor of claim 6 wherein the flow deflectors of the first and second sets are offset relative to one another along a longitudinal axis of the airflow passage.

8. The mass airflow sensor of claim 5 wherein the airflow passage includes a first portion having a first longitudinal axis, a second portion disposed downstream of the first portion and having a second longitudinal axis, and a third portion disposed downstream of the second portion and having a third longitudinal axis.

9. The mass airflow sensor of claim 8 wherein the second longitudinal axis is perpendicular to the first longitudinal axis and the third longitudinal axis is perpendicular to the second longitudinal axis.

10. The mass airflow sensor of claim 8 wherein the sensor element is disposed in the first portion of the airflow passage and the plurality of flow deflectors are disposed in the second and third portions of the airflow passage.

11. The mass airflow sensor of claim 1 wherein the sensor element includes a wire.

12. A mass airflow sensor comprising:
a housing defining an airflow passage configured to receive air flowing toward a combustion chamber of an engine;
a sensor element that is disposed in the airflow passage and that generates a signal indicating a mass flow rate of air flowing through the airflow passage; and
a plurality of flow deflectors that have an elongated shape, that are disposed in the airflow passage downstream of the sensor element, and that extend from an inner wall surface of the airflow passage toward an outlet of the airflow passage.

13. The mass airflow sensor of claim 12 wherein a length of each of the plurality of flow deflectors extends toward the outlet of the airflow passage and toward a longitudinal center of the airflow passage.

14. The mass airflow sensor of claim 12 wherein a thickness of each of the plurality of flow deflectors extends from a first sidewall of the airflow passage to a second sidewall of the airflow passage that is opposite of the first sidewall.

15. The mass airflow sensor of claim 12 wherein an angle between a downstream side of each of the plurality of flow deflectors and the inner wall surface of the airflow passage is between 30 degrees and 45 degrees.

16. The mass airflow sensor of claim 12 wherein the plurality of flow deflectors include a first set of flow deflectors that extend from a first inner surface of the airflow passage and a second set of flow deflectors that extend from a second inner surface of the airflow passage that is opposite of the first inner surface.

17. The mass airflow sensor of claim 16 wherein the flow deflectors of the first and second sets are offset relative to one another along a longitudinal axis of the airflow passage.

18. The mass airflow sensor of claim 12 wherein the airflow passage includes a first portion having a first longitudinal axis, a second portion disposed downstream of the first portion and having a second longitudinal axis, and a third portion disposed downstream of the second portion and having a third longitudinal axis.

19. The mass airflow sensor of claim 18 wherein the second longitudinal axis is perpendicular to the first longitudinal axis and the third longitudinal axis is perpendicular to the second longitudinal axis.

20. The mass airflow sensor of claim 19 wherein the sensor element is disposed in the first portion of the airflow passage and the plurality of flow deflectors are disposed in the second and third portions of the airflow passage.

* * * * *